Feb. 21, 1928.
B. J. GOLDSMITH ET AL
1,660,158
OPERATING HANDLE AND PROCESS OF FORMING THE SAME
Filed Feb. 27, 1925
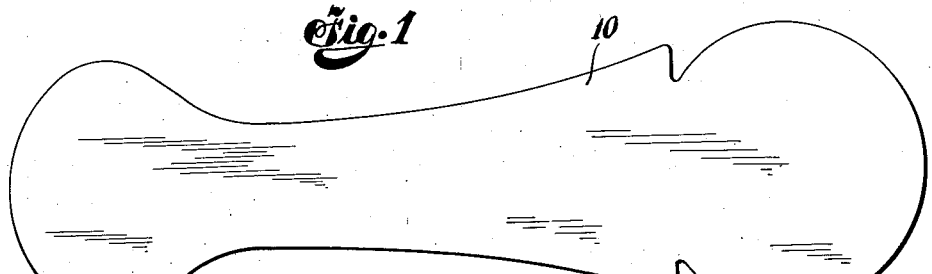
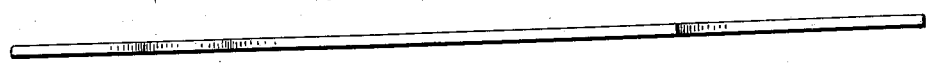
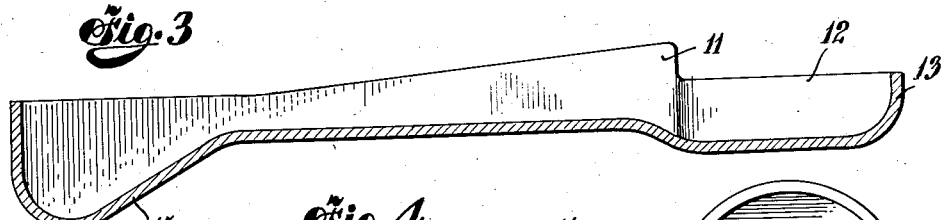
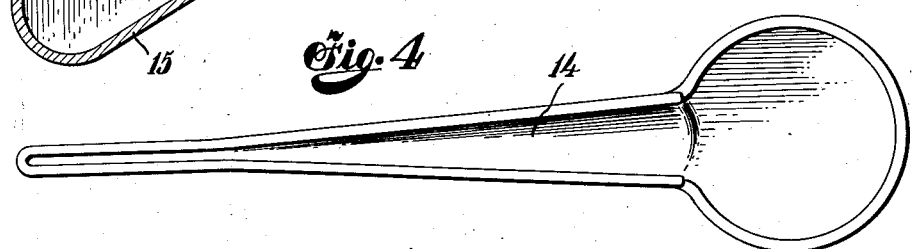
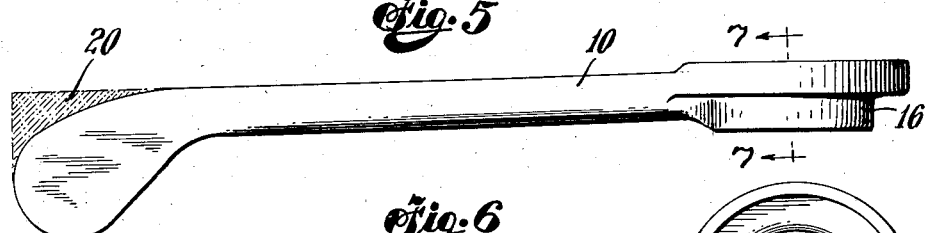
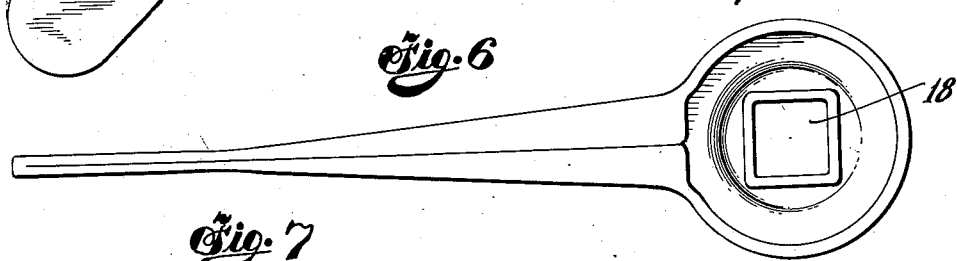
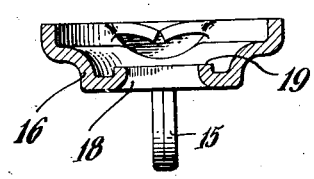
INVENTORS
Bertram J. Goldsmith.
Emil Koeb.
BY Townsend + Decker
ATTORNEYS Patented Feb. 21, 1928.

1,660,158

UNITED STATES PATENT OFFICE.

BERTRAM J. GOLDSMITH, OF NEW YORK, AND EMIL KOEB, OF TUCKAHOE, NEW YORK, ASSIGNORS, BY MESNE ASSIGNMENTS, TO PERFECT WINDOW REGULATOR CORPORATION, OF LONG ISLAND CITY, NEW YORK, A CORPORATION OF DELAWARE.

OPERATING HANDLE AND PROCESS OF FORMING THE SAME.

Application filed February 27, 1925. Serial No. 11,924.

This invention relates to improvements in operating handles in general and particularly to handles for operating closures such as windows in closed automobile construction.

It is an object of the invention to provide a handle of the type referred to which can be formed from sheet material with a minimum amount of labor and expense. It is another object to provide a strong and durable operating handle and one which will be neat in appearance. Other objects will appear from the following description taken in connection with the drawings in which:

Fig. 1 shows a metal blank cut in the proper shape for the construction of the handle;

Fig. 2 is an edge view thereof;

Fig. 3 is a sectional view of the blank shown in Fig. 2 after the same has been stamped or drawn into approximately the shape of the operating handle;

Fig. 4 is a view looking down upon the structure of Fig. 3;

Figs. 5 and 6 are elevational views of the completed handle ready for installation; and Fig. 7 is a sectional view taken substantially on the line 7—7 of Fig. 5.

In the production of the operating handle disclosed herein the blank 10 indicated in Figs. 1 and 2 is first cut from a strip of sheet metal. This blank is of a proper configuration to provide the securing socket, shank, and operating handle described in detail below. The next step in the formation of the handle comprises passing the blank through a stamping or drawing machine in which the material thereof is bent into a substantially channel shape as indicated in Figs. 3 and 4, the flanges 11 projecting above the body of the material. This stamping process leaves the cup-shaped socket portion 12 with its flanged edge 13 circular or any other desired shape. The shank portion 14 is tapered, the portion adjacent the socket 12 being relatively wide and the shank tapering gradually toward the outer or free end portion thereof where the operating or hand grip portion 15 is formed. The first stamping or drawing of the material leaves the sides of the hand grip portion 15 close together but slightly spaced and leaves the projecting flanges 11 in the position shown in Figs. 3 and 4. The next step in the process is to tightly compress the two layers of material to form the handle 15 and to bend the flanges 11 inwardly or toward one another so that there is formed the hollow operating shank 14 and the tightly compressed operating handle 15 as shown particularly in Fig. 6.

The stepped portion 16 of the socket member 13 may be stamped simultaneously with the second stamping operation referred to above or may be formed by a separate operation or may be omitted. The socket member is apertured to be received by and secured to an operating shaft by having the opening 18 stamped from the center thereof. The opening 18 is preferably stamped from the outer side or face of the handle and is formed with the inwardly extended reinforcing flange 19 as shown particularly in Fig. 7.

The inner or rearward face of the socket portion 12 is preferably formed in a plane slightly out of the plane of the inner face of the shank 10 in order that the shank and handle portion will be free of the structure to which the handle is secured. The material remaining on the bottom or inner side of the hand grip 15 is preferably cut away, as indicated at 20, in order that there will be no sharp edges and in order to further avoid contact with the door or other structure upon which the handle is secured.

It will be seen that by the process herein described we form an operating handle from a single sheet of material, the final product being strong and durable and presenting a pleasing appearance. The structural details may obviously be varied to suit different conditions without departing from our invention.

While we have shown and described a specific embodiment of our invention it is to be understood that we are not to be limited thereby but that the scope of the invention is defined in the appended claims.

We claim as our invention:

1. As an article of manufacture, an operating element formed of sheet material and provided with an apertured securing head lying mainly in one plane, an operating hand grip, and a closed hollow shank connecting said head and hand grip, said shank throughout the major portion thereof having the sides thereof spaced and presenting a closed exterior, the free edges of the material of which said securing head is formed being extended away from the outer face of said element at the outer edge thereof and adjacent the aperture therein.

2. The process of forming a hand operating element, comprising cutting a blank of sheet metal to the desired shape, stamping the blank to form a dished securing socket, a shank and a hand grip, and thereafter bending the edges of the material forming said shank, removing a portion of the material from said socket to form an opening and turning the material of said socket adjacent said opening inwardly away from the outer face of said socket.

Signed at New York in the county of New York and State of New York this 26th day of February A. D. 1925.

EMIL KOEB.
BERTRAM J. GOLDSMITH.